United States Patent [19]

van der Lely

[11] 4,237,679
[45] Dec. 9, 1980

[54] MOWING MACHINE

[76] Inventor: Cornelis van der Lely, 7, Brüschenrain, Zug, Switzerland

[21] Appl. No.: 889,951

[22] Filed: Mar. 24, 1978

[30] Foreign Application Priority Data

Mar. 30, 1977 [NL] Netherlands ............ 7703424

[51] Int. Cl.³ ............................................ A01D 55/18
[52] U.S. Cl. ........................................ 56/13.6; 56/295
[58] Field of Search ................ 56/6, 13.6, 192, 295, 56/16.4, 11.2, 11.9

[56] References Cited

U.S. PATENT DOCUMENTS

| 1,397,365 | 11/1921 | Cook | 56/11.2 |
|---|---|---|---|
| 3,469,378 | 9/1969 | Heesters et al. | 56/11.9 |
| 3,604,189 | 9/1971 | Harer et al. | 56/295 |
| 3,699,755 | 10/1972 | Hauser | 56/16.4 |
| 4,050,224 | 9/1977 | Oosterling | 56/295 |
| 4,141,202 | 2/1979 | Oosterling | 56/295 |

Primary Examiner—Robert A. Hafer
Attorney, Agent, or Firm—Penrose Lucas Albright

[57] ABSTRACT

Mowing apparatus for connection to the lifting device of a tractor which is powered by the power take-off of the tractor. The apparatus includes a three-point trestle for mounting on the three-point lift device of the tractor, the trestle supporting a parallelogram suspension gear for the mowing component, a gear box and an intermediate telescopic driving shaft for the mowing elements. The parallelogram has a suspension gear including two foldable arm portions whereby the mowing component can be rotated upwardly for transport. The intermediate drive shaft is connected to the mowing component via a gear box. The mowing component is made up of four gear boxes each holding four side-by-side intermeshing pinions, the four gear boxes being connected by a flat frame beam across the top of same with the pinions of adjacent gear boxes being in mesh. Each pinion is journalled in bearings connected to the frame beam thereby suspending same above the bottom of the gear box. A shaft from the pinion extends upwardly from the gear box to engage a disc with a slanting top side, a cutter being mounted at the lower portion of such disc to extend in front of the frame beam which, at its front edge, is curved to correspond with the underlying pinions. A swathboard at the outer end of the mowing component includes a plurality of rake wheels arranged in echelon having sawtooth-shaped circumferences and becoming progressively larger in diameter to the rear. A carrier for the rake wheels is pivotable within limits about horizontal and vertical axes with respect to the frame beam. A screening member is mounted on the frame beam which extends both in front and to the rear of the cutting component whereby, when seen from the side, it has an inverted wide V-configuration, the screen mechanism being resiliently deflectable.

21 Claims, 10 Drawing Figures

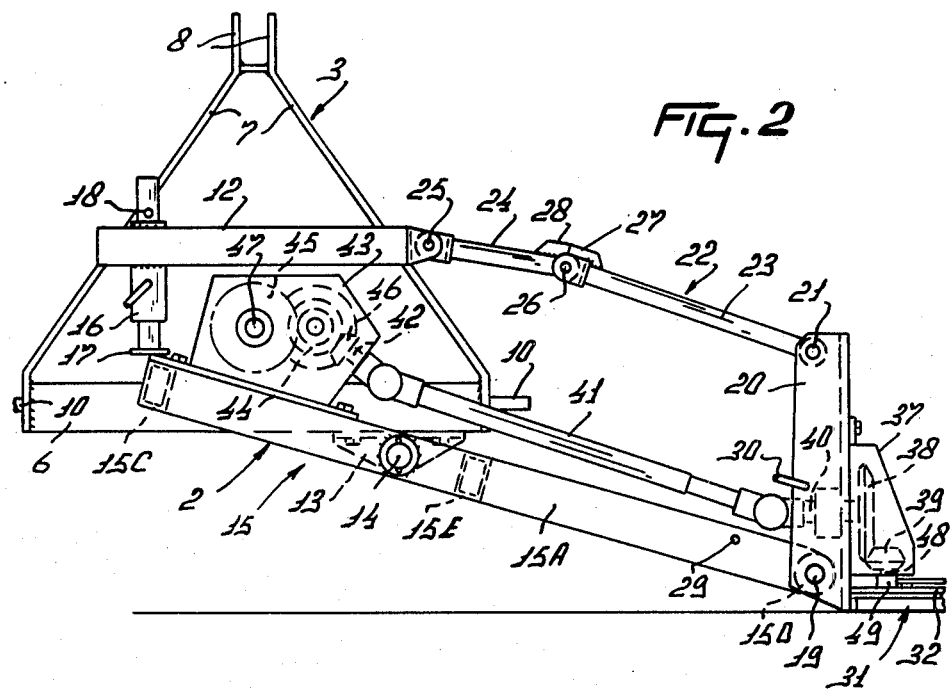
FIG. 2
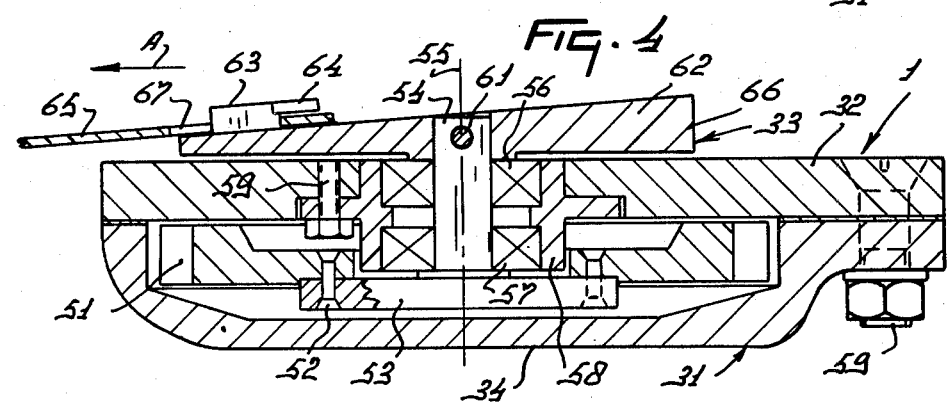
FIG. 4
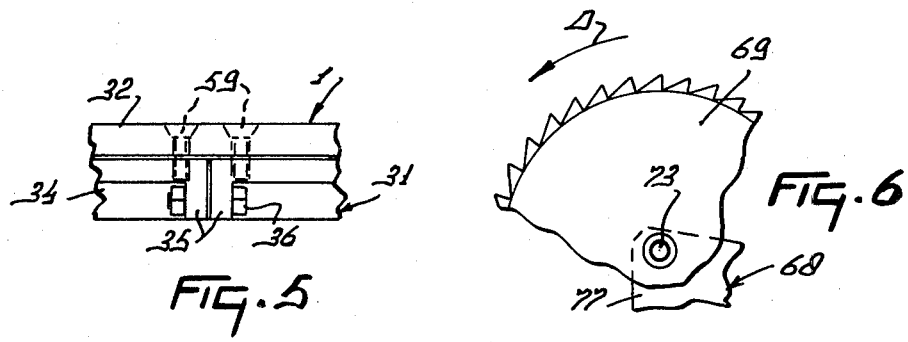
FIG. 5
FIG. 6

MOWING MACHINE

SUMMARY OF THE INVENTION

This invention relates to mowing machines.

According to the present invention there is provided a mowing machine with a number of mowing elements arranged in a row near each other, each mowing element comprising at least one pivotably mounted cutting member; there being a gear wheel housing mounted below said mowing elements and the pivot axis of each cutting member, as seen from above, being inside the circumference of a gear wheel driving the corresponding mowing element.

For a better understanding of the invention and to show how the same way be carried into effect, reference will now be made, by way of example, to the accompanying drawings, in which:

BRIEF DESCRIPTION OF THE DRAWINGS

FIG. 2 is a rear view of part of the mowing machine of FIG. 2 taken on the line II—II in FIG. 1 and on a larger scale;

FIG. 3 is an enlarged plan view of part of the machine,

FIG. 4 is an enlarged sectional view taken on the line IV—IV in FIG. 3;

FIG. 5 is a view from the rear of a detail, taken at V—V in FIG. 3;

FIG. 6 is an enlarged detail view in the direction of arrow VI in FIG. 1 of part of a swath building device of the mowing machine;

DESCRIPTION OF THE PREFERRED EMBODIMENTS

Figure 1:
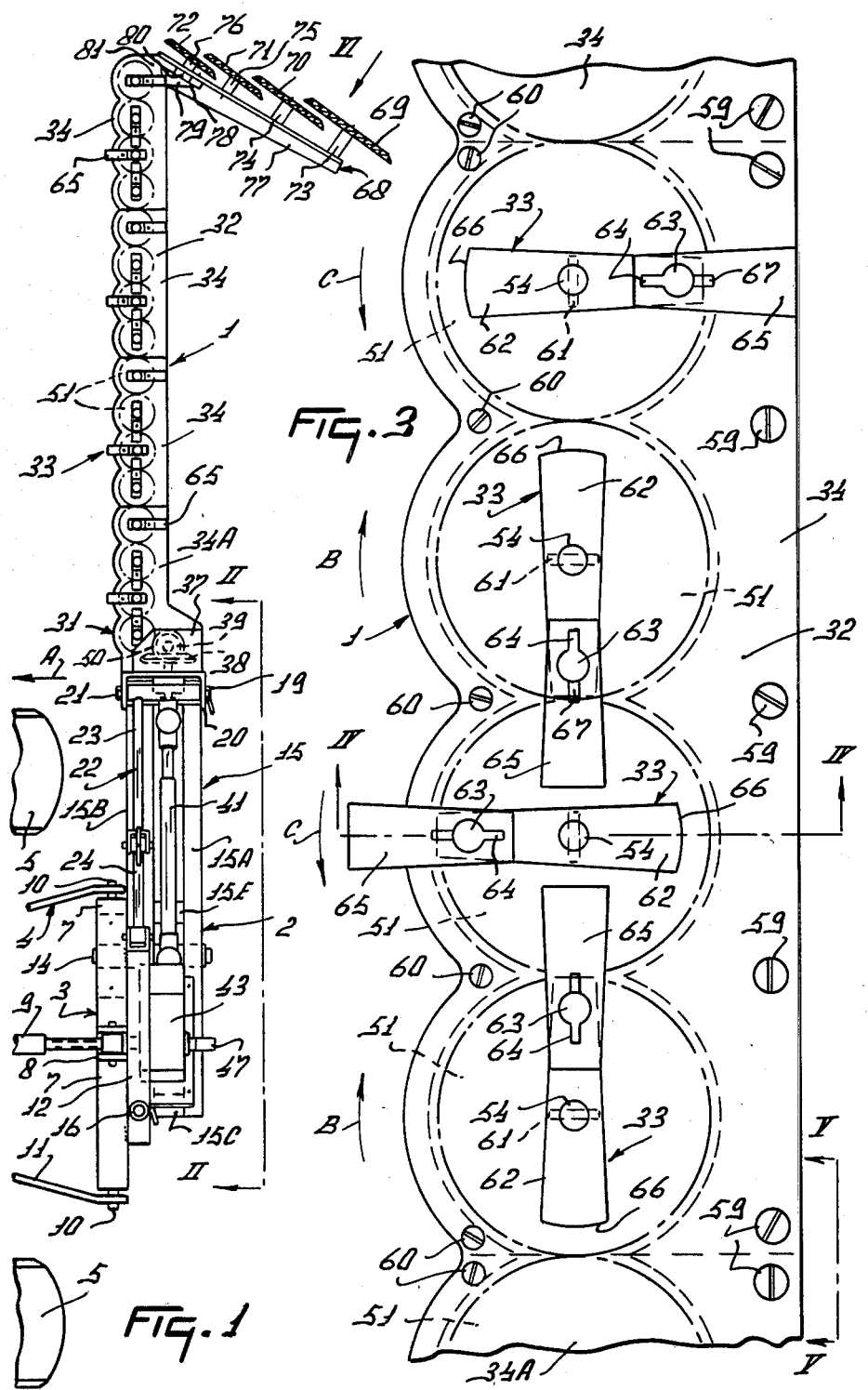
FIG. 1 is a plan view of a mowing machine shown attached to the lifting device of a tractor.

Referring first to FIG. 1 the mowing machine shown has a cutter bar 1 shown in the Figure connected by means of an intermediate frame 2 and a three-point trestle 3 with the three-point lifting device 4 at the rear (with respect to the direction of operative travel A over the ground) of a tractor 5. The three-point trestle 3 includes (see also FIG. 2) two upwardly converging frame members 7 extending from a horizontal supporting beam 6 and having, near the top, parallel ears 8 providing the means for attachment to the top rod 9 of the three-point lifting device 4. The supporting beam 6 is furthermore provided at both ends with pins 10 for coupling to the two lifting arms 11 of the three-point lifting device 4.

At the rear the three-point trestle 3 has rigidly secured thereto a hollow beam 12 extending parallel to the supporting beam 6 and connected with the rear edge portions of the frame members 7, this beam 12 being located substantially midway of the distance between the supporting beam 6 and the ears 8, see FIG. 2. The lower side of the supporting beam 6 is provided near one end with a support 13 mounting a horizontal pivot shaft 14 extending in the direction of travel A and consisting of a substantially hollow, tubular member. Pivotable about the pivot shaft 14 is a supporting beam 15 constructed, viewed in plan, of two longitudinally spaced beams 15A and 15B extending transversely of the direction of travel A and interconnected by intermediate parts 15C, 15D and 15E of which the intermediate parts 15C and 15D are near the ends and the part 15E is in the proximity of the pivot shaft 14 approximately at the level of the end of the supporting beam 6. The part 15E constitutes a stiffening member. The supporting beam 15 constitutes the main part of the intermediate frame 2 and is, therefore, comparatively heavy.

As shown in FIG. 2 the hollow beam 12 is provided near a free end of the supporting beam 15 with a buffer 16, which is variable in length and is provided with a stop 17 the distance of which from the hollow beam 12 is adjustable by placing a pin in a selected one of a plurality of bores 18. The buffer 16 limites pivotal movement of the supporting beam 15.

At the end remote from the three-point trestle 3 the supporting beam 5 is pivotally connected by means of a horizontal pivot shaft 19, extending in the direction of travel A, with a support 20 having a U-shaped form viewed in plan, the web and the limbs of which extend vertically a selected. As shown in FIG. 2 the web occupies a substantially vertical position. Near the top the limbs of support 20 are transversed by a pivot shaft 21 which is connected with an arm 22 near the end thereof front with respect to the direction of travel A. The arm 22 is made up of two portions 23 and 24 and is adapted to turn, at the end remote from the pivot shaft 21, about a pivot shaft 25 connected with the hollow beam 12. The pivot shafts 14, 19, 21 and 25 are located at the corners of a parallelogram. The arm portions 23 and 24 are relatively pivotable about a pivot shaft 26, relative pivotal movement of these two portions being limited on one direction by stop lugs 27 and 28 on the portion 23 and 24 respectively. Therefore, the pivot shaft 26 can move with respect to the supporting beam 15 only over a limited distance. As is shown in FIG. 2, the arm portions 23 and 24 are, in the operational state, at an angle of less than 10° to one another.

The supporting beam 15 has a bore 29 for cooperation with a locking pin 30 inserted in support 20. In this way support 20 can be fixed in a transport position relative to the supporting beam 15, as will be described later with reference to FIG. 7.

On the side remote from the intermediate frame 2 support 20 is connected via a flat frame beam 32 with a gear trough 31 which is covered on its top by flat frame beam 32. As is shown in FIG. 4, the frame beam 32 serves not only as a cover for the trough 31 but also as a support for a large number in the machine illustrated sixteen - of mowing elements or cutting members 33. The gear trough 31 consists of a plurality of releasable gear boxes 34, each of which surrounds four pinions 51 for rotating four cutting members 33. Each gear box preferably has a length of about forty centimeters. As shown in the plan view of FIG. 3 each gear box 34 has a scalloped edge portion at the front and is straight at the rear. The operative part of each cutting member projects forwardly of its gear box, whereas it does not project beyond the rear edge of the gear box.

As shown in FIG. 5, neighboring gear boxes 34 are provided with flanges 35 fastened to one another by bolts 36. It is preferred to sandwich a packing of, for example, teflon between the flanges 35. The portion of the gear trough 31 connected with support 20 is formed by a gear box 34A which is widened rearwardly in the proximity of the supporting part 20 (see FIG. 1). The web of support 20 carries a gear box 37 containing a 90° pinion transmission including a comparatively large bevel pinion 38 and a smaller bevel pinion 39 (FIG. 2). The pinion 38 is on a shaft 40 which extends through the web of support 20 and is provided at the end remote from the pinion 38 with splines. The shaft 40 is thus connectable with a universal auxiliary shaft 41, which can follow the deflections of the cutter bar 1 by means of universal joints.

The auxiliary shaft 41 is coupled at the end remote from the shaft 40 with an output shaft 42 of a gear box 43. The gear box 43 contains mainly two meshing pinions 44 and 45 having a comparatively small diameter and a comparatively large diameter respectively. In order to obtain the desired number of revolutions of the cutting member 33 the pinions 44 and 45 may be selected accordingly. The shaft 42 is coupled by means of a bevel pinion 46 with the pinions 44 and 45. The gear box 43 is bolted to the top of the supporting beam 15, as shown in FIG. 2, between the part 15C and the pivot shaft 14. The pinion 45 is on a horizontal shaft 47, extending in the direction of travel A and projecting out of the gear box 43 both at the front and at the rear. At the front of the gear box 43 the shaft 47 is coupled in a manner not shown through a universal auxiliary shaft with the power take-off shaft of the tractor 5. At the rear the shaft 47 is available for driving an additional implement.

The bottom of gear box 37 is disposed at a small distance above the cover 32 so that space is left between the top of the cover-forming frame beam 32 and the bottom of the gear box 37, in which space the cutting member 33 adjacent support 20 rotates. The pinion 39 is on a shaft 48 which is screened by a sleeve 49 in the space between the box 37 and the frame beam 32.

The shaft 48 extends into the gear box 34A, where it carries a pinion 50 (FIG. 1). The pinion 50 is drivably in mesh with a pinion 51 (FIG. 4). The pinion 51 is the first pinion of a large sequence of preferably spare gears which are all disposed in the gear trough 31. The diameter of the addendum circle of these pinions amounts to about 10.5 centimeters. The pinions 51 are cylindrical with hollow centers. Each pinion 51 has its bottom face connected, by means of a number of countersunk or recessed head screws 52, with the top face of a ground or base plate 53 having a circular shape viewed in plan. This base plate 53 is rigidly secured, for example, by casting or welding, to a rotor shaft or stub shaft 54 (FIG. 4). By means of bearings 56 and 57 at the top and bottom respectively the stub shaft 54 is rotatable about a rotary axis 55 in a bearing support 58. Bearing support 58 is connected by bolts 59 with the bottom of the frame beam 32. In this way each pinion 51 is suspended from the frame beam 32.

As already stated, the frame beam 32 covers the four gear boxes 34 and 34A. The rear of the frame beam 32 is connected with the gear trough 31 by means of bolts 59 (FIG. 4), the head of each bolt being countersunk in the frame beam 32. At the front bolts 60 establish the connection between the frame beam 32 and the trough 31. As shown in FIGS. 3 and 5, the bolts 59 and 60 are also arranged in close proximity to one another between two adjacent gear boxes 34. For sealing purposes a packing of, for example, teflon is provided between the frame beam 32 and the trough 31.

With the described disposition of the cutting members 33 the distance between neighboring rotary axes 55 amounts to about ten centimeters. The space enclosed in the gear box 34 or 34A located beneath each cutting member 33 is preferably such that the pinion 51 associated with the cutting member is fairly intimately embraced, that is there is little free space around each pinion 51.

Neighboring cutting members rotate in opposite senses as indicated by arrows B and C in FIG. 3. Each cutting member 33 is fastened by means of a fixing pin 61 to the associated stub shaft 54. Each cutting member 33 consists of a rotor 62 formed by a strip that is wedge-shaped in section as shown in FIG. 4. The lower face of the rotor 62 is parallel to the top face of the frame beam 32, whereas the top face is at an acute angle of, preferably, less than 10° and more preferably about 8° to the top face of the frame beam 32. Near one end each rotor 62 has a pin 63 at right angles to its top surface, the extended axis of pin 53 intersects the extended rotor axis 55 at a small acute angle which is, in the machine illustrated, about 4°. The pin 63 is provided on the side facing the rotary axis 55 with a projection or cam 64. The pin 63 pivotably supports a cutter formed by an elongate blade 65.

Viewed in plan (FIG. 3) and in the sectional view of FIG. 4 the part of the rotor 62 remote from the cutter 65 is thickened and widened to serve as a counter-weight 66. In order to fasten the cutter 65 to the pin 63 it has a slot 67 corresponding to the cam 64 so that by turning it through 180° the cutter can be mounted on, or removed from, the pin 63.

The cutter 65 extends to such a distance beyond the front edge of the frame beam 32 that neighboring cutters 65 can overlap in the vicinity of the narrowest part of the trough 31, viewed in the direction of travel A. As clearly shown in FIG. 3 immediately adjacent rotors are angularly displaced relatively to one another by 90°. The resulting 90° off-set of adjacent cutters 65 (FIG. 3) provides, in addition, a large overlap region. Each cutter 65 preferably has a slightly trapezoidal shape as viewed in plan such that near the end remote from the pin 63 the cutter 65 has a larger width than at the end nearest the rotary axis 55. Each cutter 65 is preferably parallel to the top face of the rotor 62. The position and the length of each cutter 65 with respect to its pin 63 are such that the cutter 65 preferably does not intersect the prolongation of the top surface of the frame beam 32. The largest dimension of the rotor 62 is preferably smaller than the diameter of the addendum circle of its pinion 51. In a direction parallel to the top surface of the frame beam 32 this largest dimension amounts to about nine centimeters. The length of the cutter 65 is preferably chosen as that the cutter projects over a distance of about two centimeters in front of the front of the gear trough 31. The pivot axis (that is the axis of the pin 63) of each cutter 62 is inside the circumference of the pinion 51 that drives the cutting member 33 that carries the cutter 62.

The end of the cutter bar 1 remote from the intermediate frame 2 is provided with a swath building device 68 that includes four rake wheels 69, 70, 71 and 72 having the lowermost points of their peripheries at substantially equal distances from the ground. These rake wheels (see FIG. 1) are arranged in a row and overlapping one another at least partly. The diameter of the foremost rake wheel 72 with respect to the direction of travel A is smaller than the diameter of the next rake wheel 71 and so on, the diameters of the four rake wheels 69 and 72 differing to an extent such that the diameter of each rake wheel is about 25% smaller than that of the next-following rake wheel. Each rake wheel is formed by a swath board, the outer rim of which is bent over towards the cutter bar and is provided with regular notches (FIG. 6). The notches have a sawtooth shape, the teeth formed at the periphery extending rearwardly viewed in the direction of rotation D of the rake wheel in operation. The rake wheels are each fastened to a shaft 73, 74, 75 and 76 respectively, these shafts being parallel to one another and trailing at an acute angle of preferably about 50° to 60° to the direction of travel A. Viewed in a direction parallel to the shafts 73 to 76 each rake wheel overlaps by about 25% of the diameter of the next-following rake wheel. The shafts 73 and 76 are fastened to a carrier 77 inclined upwardly away from the cutter bar 1 and pivotable to a limited extent with respect to the cutter bar 1 about a horizontal pivot shaft 78. The pivot shaft 78 preferably extends parallel to the shafts 73 to 76. The pivot shaft 78 is connected with a lug 79 which is pivotable about a substantially vertical pivot shaft 80 and is connected with the rear of the external part of the cutter bar 1. In the outward direction with respect to the intermediate frame 2 turning of the lug 79 about the shaft 80 is limited by a stop part 81 of the frame beam 32.

The mowing machine described above operates as follows.

During operation the mowing machine is suspended from the three-point lifting device 4 of the tractor 5 and in the operational state the intermediate frame 2 occupies the position shown in FIG. 2. The power take-off shaft of the tractor drives the pinions 51 within gear box 43, the auxiliary shaft 41 and the gears or pinions 38, 39, and 50 so that with the illustrated disposition of the cutting member 33 the neighboring cutting members are driven in opposite senses B and C. The construction of the cutting members shown in FIG. 4 requires that each pinion in the trough 31 is directly coupled with the superjacent cutting member 33. The results in a simple and extremely effective assembly, in which the space between each cutting member and its pinion is utilized for sealing the trough 31 by means of the cover-forming frame beam 32. This beam 32 serves as a main carrier for the cutter bar 1 and therefore is a rigid structure. By the mode of fastening of the stub shaft 54 the cutting member is fastened to the frame beam 32. By its connection with the stub shaft 54 each pinion 51 is also connected with the frame beam 32. Thus the trough 31 only serves for accommodating the pinions 51 so that it can be of comparatively simple and light-weight structure. The trough 31 is composed of sections formed by the gear boxes 34 and 34A, each holding four cutting members. In this way a trough is formed which can be readily replaced in parts, which may be important when, for example, the bottom of a gear box has worn out or when the through and/or the pinions have been damaged. Since each gear box has a fixed length corresponding to the dimension of the frame beam 32, a satisfactory seal is obtained between the gear boxes and the frame beam 32.

Since each cutting member 33 has only one cutter 65 double cutting is minimized yet a satisfactory overlap is obtained. The inclined position of the cutter 65 with respect to the top surface of the frame beam 32 is advantageous for cutting at a level near the ground and in conjunction with the upwardly inclined rotors 33 adjacent thereto it improves the delivery of the cut crop. Owing to the very small distance between the rotary axes 55, which distance is preferably about ten centimeters, pinions of small diameter may be employed, while in addition the front of the cutter bar 1 may have a scalloped shape so that a regular mowing effect can be ensured throughout the width of the cutter bar 1. The low weight of the small cutting elements means that the mower can be moved with comparatively high speed while satisfactory ground contact is maintained. If desired, the cutting level of the cutting member 65 can be adjusted by adjusting the top rod 9 of the lifting device 4.

The construction described above avoids the use of intermediate pinions or shafts or both so that it can be compact. The composition of the mowing machine by substantially identical modules matches the present-day efficiency requirements. Owing to the comparatively low weight of the cutting members and the pinions it is possible to use comparatively very high speed cutting members, which speed can be raised by the gear boxes 43 and 37 from 540 rev/min of the power take-off shaft to preferably about 10,000 rev/min.

The swath building device 68 permits not only of clearing a strip of ground to obtain a separation between the cut and deposited crop and the standing crop in the next run but also of obtaining an airy swath. For this purpose the disposition of the rake wheels 69 to 72 is very important. Since the rake wheels are at a given distance above the ground on the carrier 77, the rake wheels are struck by the stream of crop near the top, while the top of each rake wheel rotates in the direction of the arrow D, which gives a movement of the top of the rake wheels to the rear. Thus the crop is constantly raised in the rearward direction so that the crop can be deposited in a very airy state. In order to ensure a satisfactory grip on the crop the rake wheels preferably have their edge near the circumference bent over towards the cutter bar 1. Owing to the orientation of the teeth in the direction of rotation D the teeth will readily disengage the crop.

The parallelogram structure of the intermediate frame 2 permits the cutter bar 1 to respond smoothly to unevennesses of the ground during operation, on the one hand by pivotal motion of the portions of the arm 22 about the pivot shaft 26. The cutter bar can be set in a plurality of positions by means of the buffer 16. This may be important, for example, for cutting at a desired height above the ground surface of for mowing on a sloping surface.

Figure 7:
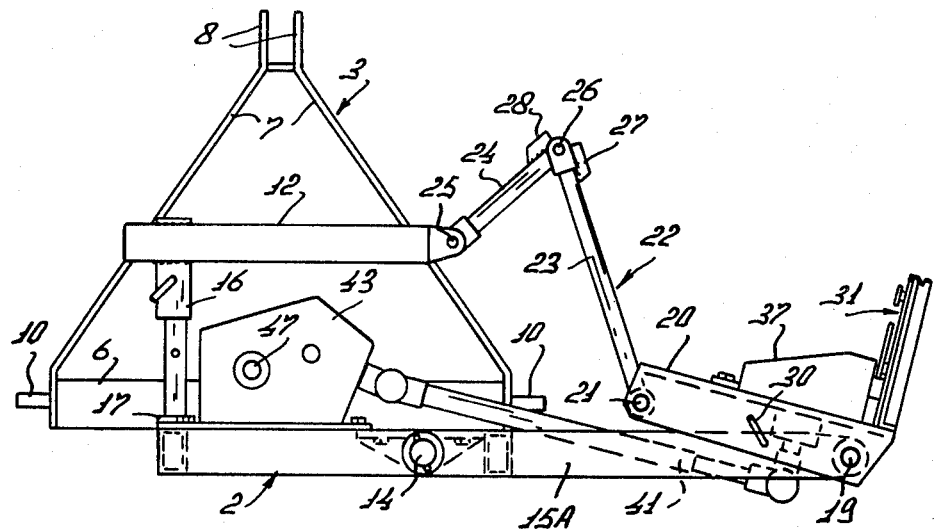
FIG. 7 shows the same part of the mowing machine as FIG. 2 but in a different position.

FIG. 7 shown a transport position of the mower, in which by means of the locking pin 30 at the cutter bar 1 is fixedly connected with the intermediate frame. In this position of pivot shaft 26 has moved over a predetermined distance in a direction of height. The supporting beam 15 extends substantially horizontally in this position and this position is fixed by the buffer 16. If desired, the buffer 16 may as an alternative, be formed by a hydraulic cylinder suitable for operation by remote control. The open construction of the supporting beam 15 allows the auxiliary shaft 41 during the pivotal movement to move between the portions 15A and 15B to beneath the frame beam (FIG. 7).

Figure 8:
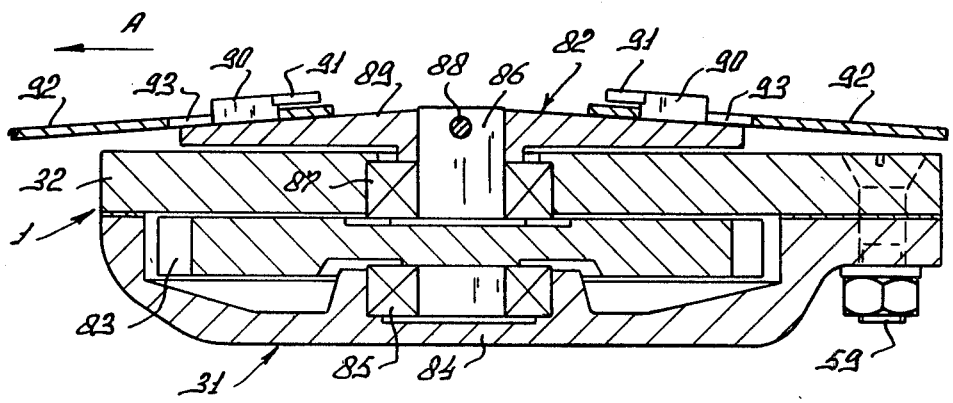
FIG. 8 is a sectional view (similar to FIG. 4 but illustrating an alternative form of mowing machine.

FIG. 8 shows a second form of the cutter bar 1 based on the same gear trough 31 closed by the cover-forming frame beam 2. In this form the cutting members 82 are also driven from below by means of pinions 83, each of which specifically serves to drive its associated cutting element 82 in accordance with the structure of the preceding embodiment. In this form the gear trough 31 is formed by gear boxes 84 having each near its center a bearing 85. The bearing 85 holds a shaft 86, which mounts the pinion 83, this shaft extending upwardly from the bearing 85 through the cover-forming frame beam 32. The shaft 86 is journalled in the cover 32 by means of a bearing 87. At the top the shaft 86 is fixedly connected by means of a safety pin 88 with a disc-shaped rotor 89, the bottom of which is substantially parallel to the surface of the frame beam 32. The top surface of the rotor 89 is of a frusto-conical form the cone of which has a half apex smaller than 10° and preferably of 8°. The diameter of the rotor 89 is preferably smaller than the diameter of the addendum circle of the pinion 83. Near the outer edge the rotor 89 has two diametrically disposed pins 90 each having a projection or cam 91 in the manner shown in the preceding form. The pins 90 serve for pivotably supporting the cutters 92, each of which has a slot 93 corresponding to the cam 91 and displaced 180° as seen in FIG. 8. The cutters 92 preferably extend parallel to the associated neighboring surface of the rotor 89. The shape and the length of the cutters 92 correspond with those of the cutters 65 in the first form. Neighboring cutters 92 are relatively off-set through 90°.

The alternative form of the cutting member 82 shown in FIG. 8 is a construction in which the frame beam 32 supports the shaft 86 and also the gear trough 84 has a supporting function. This construction may be advantageous when the shafts 86 have to be supported to the optimum, which may be required for mowing heavy crop. It should be noted, however, that the cover-forming frame beam 32 maintains its supporting function.

Figure 9:
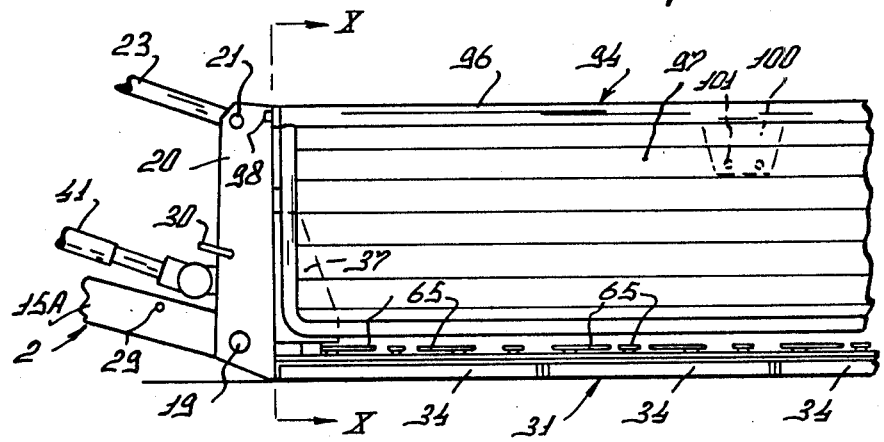
FIG. 9 is a rear view of an alternative form of mowing machine, this form being equipped with a screening device.
Figure 10:
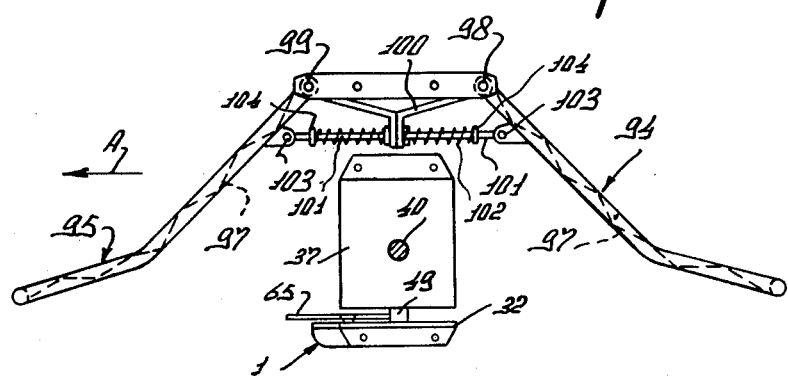
FIG. 10 is a sectional view taken on the line X—X in FIG. 9.

FIGS. 9 and 10 show a form in which the cutting members are protected by a screening member 94 at the front and by a screening member 95 on the rear. The screening assembly consisting of members 94 and 95 is only supported by the top of support 20 so that a very ample passage for the crop is obtained. Each screening member consists of a framework 96 holding a screening plate 97. FIG. 10 shows that the screening plate has a substantially zigzag-shaped form. At a distance above the cutting members and also at a distance in front of and behind the cutting members the screening members 94 and 95 respectively are bent over forwardly and rearwardly respectively, while, viewed in the direction of travel A as seen in FIG. 9, the lower edge of the screening member is located just above the cutting members. Each screening member 94 and 95 is pivotable about a pivot shaft 98 and 99 respectively, each of which shafts are supported at the end on the web of support 20.

Angular supports 100 are provided substantially midway the length of the screening members, viewed in a direction parallel to the cutter bar 1. The downwardly extending ends of the angular supports 100 serve to hold two rods 101, each of which is surrounded by a helical spring 102. The rods 101 are pivotable about shafts 103. In this manner each screening member 94 and 95 is resiliently deflectable, while, if desired, stop elements 104 of the rods 101 can limit the amplitude of the deflection.

During operation the screening members 94 and 95 serve as step or guard means against hard objects ejected by the cutting member, and the screening member 94 extending far to the front protects animals tending in a frightened flight to jump against the bent part of the screening member 94. Owing to their resiliently deflectability the screening members have a comparatively stable position, while the zigzag-shaped screening plate is sufficiently rigid to absorb relatively heavy forces.

The shape of the screening members is quite suitable for guiding long stalks on the space between the screening members so that the various stalks can be effectively cut by the cutting member, that is so say without double cuts.

Although various features of the mowing machine described and illustrated in the drawings are set forth in the following claims as inventive features it is to be understood that the invention is not necessarily limited to these features and encompasses all of the features that have been described both individually and in various combinations.

Having described my invention, what I claim as new and desire to secure by Letters Patent of the United States is:

1. A mowing machine comprising a plurality of mowing elements arranged side-by-side and adapted to rotate about upwardly extending axes, each said element including a rotor, a cutting member being mounted on each said rotor, the top surface of each said rotor being at an acute angle to the rotational axis of its corresponding said mowing element, each said rotor having the shape of a wedge as seen in a radical cross-section view, said cutting member extending parallel to the adjacent part of said top surface.

2. A mowing machine as claimed in claim 1 wherein each said cutting member is pivotably arranged on the corresponding said rotor.

3. A mowing machine as claimed in claim 2, including a pin on said rotor wherein each said cutting member is pivotable about said pin, a projection from said pin extending towards the axis of rotation of said corresponding mowing element.

4. A mowing machine as claimed in claim 3, wherein each said cutting member has on the side of said pin remote from said axis a slot corresponding to said projection.

5. A mowing machine comprising frame means and said frame means supporting a plurality of mowing elements arranged in a row, each mowing element comprising at least one pivotally mounted rotatable cutting member, said frame means comprising a gear housing, a gear contained in said housing driving a corresponding mowing element, said gear being mounted below said mowing elements, the pivot axis of each said member, as seen from above, being within the circumference of the corresponding gear, said gear being interconnected with said corresponding mowing element and a cover of said housing being located between said mowing elements and said gear wheels, said cover comprising a flat frame beam which supports said mowing elements, said housing comprising a plurality of said gear boxes, each said box accommodating a plurality of said gears.

6. A mowing machine as claimed in claim 5, wherein the center-to-center distance between adjacent rotatable shafts for said mowing elements arranged above said housing is about ten centimeters.

7. A mowing machine as claimed in claim 6, wherein adjacent said cutting members are relatively off-set so that they are at an angle of about 90° to one another.

8. A mowing machine as claimed in claim 7, wherein each said mowing element comprises only one cutting member.

9. A mowing machine as claimed in claim 5, wherein each said mowing element comprises two cutting members.

10. A mowing machine as claimed in claim 5, a gear transmission for driving mowing elements which is adapted to be coupled via a double reduction gearing with the power take-off shaft of a tractor.

11. A mowing machine as claimed in claim 5, wherein, at least at the front with respect to the normal operative direction of travel of the machine, said mowing elements are protected by a screening member mounted on said frame means, said screening member extending from the top to the front of said mowing elements viewed in the normal forward direction of travel of the mowing machine.

12. A mowing machine as claimed in claim 11, wherein said screening member is bent over in said forward direction of travel.

13. A mowing machine comprising a plurality of mowing elements arranged side-by-side and adapted to rotate about upwardly extending axes, supporting means interconnected to said mowing elements, a screening member mounted on said supporting means near the front of said mowing elements and parallel thereto with respect to the normal operative direction of travel of the machine, cutting members included in said mowing elements which are disposed behind said screening member, said screening member having a forwardly downwardly inclined configuration, said screening member comprising a screening plate and a framework, said screening plate being arranged in said framework, said screening plate having a zigzag configuration as seen in a cross-sectional view.

14. A mowing machine as claimed in claim 13, wherein said screening member is resiliently deflectable in at least one direction.

15. A mowing machine as claimed in claim 13 including an intermediate supporting frame for said mowing element, wherein the screening member is supported by said supporting means adjacent the end of said mowing elements and said frame, said frame adapted to be connected to a tractor.

16. A mowing machine as claimed in claim 13, wherein said screening member is arranged in a symmetrical fashion relative to said mowing elements as seen from the side.

17. A mowing machine as claimed in claim 13, wherein said screening member comprises a screening plate and a framework, said screening plate being arranged in said framework.

18. A mowing machine as claimed in claim 5, wherein a transmission is provided to drive said mowing elements at about 10,000 revolutions per minute.

19. A mowing machine comprising a plurality of mowing elements arranged side-by-side and adapted to rotate about upwardly extending axes, each said element including a rotor, a cutting member being mounted on each said rotor, the top surface of each said rotor being at an acute angle to the rotational axis of its corresponding said mowing element, said cutting member extending parallel to the adjacent part of said top surface, a thicker part of each said rotor constituting a counterpoise for a further part of such rotor which is carrying said cutting member.

20. A mowing machine as claimed in claim 5, wherein each said gear box accommodates an even number of said gears.

21. A mowing machine as claimed in claim 5, wherein each said gear box accommodates four said gears.

* * * * *